Patented Aug. 8, 1944

2,355,240

UNITED STATES PATENT OFFICE 2,355,240

MINERAL OIL

Orland M. Reiff, Woodbury, N. J., assignor to Socony-Vacuum Oil Company, Incorporated, New York, N. Y., a corporation of New York No Drawing. Application April 17, 1940,
Serial No. 330,065

27 Claims. (Cl. 252—35)

This invention relates to mineral oil compositions and is more particularly related to mineral oil compositions of the lubricant type to which an agent has been added for the purpose of improving the oil in certain respects. It is an object of this invention to provide a novel class of mineral oil addition agents which will improve one or more important properties of a mineral oil fraction. It is a further object to provide mineral oil compositions containing such improving agents.

More specifically, the present invention is directed generically to the oil-miscible substantially stable sulfides, selenides or tellurides of the metal carboxylate salts of the oxyacid esters of nuclear alkyl-substituted hydroxyaromatic carboxylic acids and preferably the inorganic acid esters of such hydroxyaromatic carboxylic acid salts (or condensates thereof), as mineral oil-improving agents, the miscibility in mineral oil being obtained preferably by an alkyl substituent in the aryl nucleus.

In other words, the addition agents of the present invention are oil-miscible substantially stable aromatic sulfides, selenides, or tellurides characterized by the presence of an aromatic nucleus having a nuclear hydrogen replaced by an oxyacid ester group and another nuclear hydrogen replaced by a carboxyl group the hydrogen of which is substituted with a metal. Also, the addition agents of the present invention are preferably further characterized by the substitution of at least one nuclear hydrogen atom with an oil-solubilizing substituent. This solubilizing substituent is preferably an alkyl group. Other nuclear substituents may also be present as explained further on.

The addition agents of the present invention are considered to be condensation products wherein two or more of the aromatic nuclei of the characterizing esterified hydroxyaromatic metal carboxylate groups are presumably interconnected through a linkage (or linkages) comprised of an element selected from the group consisting of sulfur, selenium, and tellurium preference being given to sulfur. Through the introduction of sulfur, for example, in the manner or manners to be hereinafter described, I obtain what may be broadly termed a sulfide of an oxyacid ester of a hydroxyaromatic carboxylic acid in which the carboxyl hydrogen is substituted with its equivalent weight of metal. The carboxyl group may be attached directly to the aromatic nucleus or indirectly through an aliphatic chain although the former is the preferred type.

In the preferred multifunctional class of sulfides of the present invention I have found such sulfides to possess increased pour depressant and viscosity index improving properties as well as improved antioxidant properties. The improved antioxidant properties are particularly significant in retarding the development of acidity in certain types of oils and under certain conditions of use.

The condensed preferred nuclear-alkyl-substituted esterified hydroxyaromatic carboxylic acid salts contemplated herein as oil-improving agents, are, as aforesaid, condensation products and may be represented by the general formula (I)
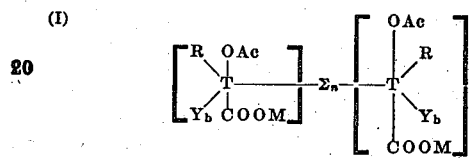

in which T represents a mono- or poly-cyclic aromatic nucleus; $\Sigma$ represents sulfur, selenium, or tellurium; $n$ represents a whole number from one to four; Ac represents the radical of an oxyacid which remains after removal of an acidic hydroxyl group therefrom; R represents an oil-solubilizing group, preferably at least one alkyl group having at least 20 carbon atoms, and $Y_b$ represents residual hydrogen, added hydrogen obtained by hydrogenation or a substituent group in the aryl nucleus T, as will be hereinafter more fully described, and M represents the hydrogen equivalent of a metal.

For the preferred multifunctional oil-improving agents R represents at least one alkyl group corresponding to a relatively high molecular weight aliphatic hydrocarbon (herein referred to as a heavy alkyl group. This group R should, for the desired multifunctional oil-improving property, be at least one alkyl group containing at least twenty-carbon atoms, and, as will hereinafter appear, may preferably be derived from or correspond to the heavy aliphatic hydrocarbons which predominantly characterize an aliphatic hydrocarbon material of the character of petroleum wax.

In addition to the oil-solubilizing alkyl group R, the aryl nuclear may contain residual hydrogen, added hydrogen as above indicated or substituents which may have a positive, or negative, or neutral oil-solubilizing effect. Such added hydrogen, residual hydrogen or substituents are, as aforesaid, indicated by $Y_b$ in the foregoing general Formula I, Y representing residual hydrogen or added hydrogen or substituents selected from the group consisting of hydroxyl, ester, xanthate, alkyl sulfide, aryl sulfide, keto, alkoxy, aroxy, aldehyde, oxime, aralkyl, aryl, alkaryl, halogen, nitroso, N-thio, N-acyl and cyano substituents and $b$ representing the number of Y's and being equal to zero or a whole number corresponding to the number of replaceable hydrogens not substituted with OAc, COOM, $\Sigma_n$ or R.

In general, it appears that any metal may be employed as the metal M in compounds or condensation products of the aforesaid type to provide valuable oil addition agents. The metals contemplated herein may be broadly classified as the metals of groups one to eight inclusive of the periodic system capable of forming carboxylate salts. These metals comprise the following: the alkali metals: lithium, sodium, potassium, rubidium, and caesium; the alkaline earth group: beryllium, magnesium, calcium, strontium, and barium; the metals zinc, cadmium, mercury, scandium; the metals aluminum, gallium, indium, thallium, titanium, zirconium, cerium, thorium, germanium, tin, and lead; vanadium, columbium, and tantalum; arsenic, antimony, and bismuth; chromium, molybdenum, tungsten, and uranium; rhenium, manganese, iron, cobalt, and nickel; ruthenium, rhodium, and palladium; osmium, iridium, and platinum.

Some of the rare earth metals are given in the foregoing. Other rare earth metals suitable for the alkylated acylated hydroxyaromatic carboxylic acid salts contemplated herein are those now commercially available as the cerium and yttrium group; namely, a mixture of praseodymium, neodymium, samarium, europium, gadolinium, terbium, dysprosium, holmium, erbium, thallium and lutecium.

The selection of a metal will, of course, depend to a certain extent upon the character of the oil in which the addition agent is to be added and the conditions under which it is to be used. Certain metals such as lead, zinc, and tin, for example, may contribute to the oiliness characteristics of the oil. The alkali metals are not so desirable where the oil is to be used in the presence of water because of the tendency of the addition agents containing same to cause emulsification. A preferred group of metals, the esterified hydroxyaromatic carboxylated sulfide salts of which have been prepared and tested for use in lubricating oils, is comprised of tin, aluminum, zinc, chromium, and cobalt, with special preference given to tin for use in crankcase lubricants of the type used in automotive engines.

Examples of acid chlorides of the inorganic acids of non-metallic or acidic metalloid elements that may be used in the acylation reaction mentioned above are the following: $POCl_3$, $PSCl_3$, $BCl_3$, $SiCl_4$, $PCl_3$, $PCl_5$, as well as the corresponding bromides and iodides.

In general, as previously indicated, any acyl chloride or anhydride of an inorganic acid may be employed in the esterification or esterification reaction which forms an esterified reaction product which is substantially stable toward mineral oils when intimately admixed therewith.

Representative examples of the organic acid anhydrides or acyl halides which may be used for this purpose are the anhydrides or acyl halides of the following organic acids:

(1) Saturated aliphatic mono carboxylic acids ranging from acetic to montanic acid.

(2) Unsaturated aliphatic monocarboxylic acids such as acrylic, oleic, eladic, crotonic, etc.

(3) Saturated aliphatic polycarboxylic acids such as succinic, oxalic, adipic, sebacic, etc.

(4) Unsaturated aliphatic polycarboxylic acids such as maleic and fumeric acids.

(5) Substituted mono and polycarboxylic aliphatic acids containing halogen, hydroxyl, amino, ether or keto groups such as chloracetic acid, hydroxystearic acid, tartaric acid, glycollic acid, octyloxyacetic acid and pyroracemic acid.

(6) Aromatic monocarboxylic acids such as benzoic and naphthoic acids.

(7) Aromatic polycarboxylic acids such as phthalic acid.

(8) Alkylene-substituted aromatic monocarboxylic acids such as cinnamic acid.

(9) Aryl substituted mono and polycarboxylic aliphatic acids with carboxyl in the side chain such as phenylstearic, naphthyl stearic and naphthyl polystearic acids.

(10) Substituted aromatic mono and polycarboxylic acids containing halogen, hydroxyl, amino, alkyl, aryl, aralkyl, keto, nitro or alkoxy in the nucleus, such as chlorbenzoic, salicylic, anthranilic, toluic, phenyl-benzoic, benzoylbenzoic, nitrobenzoic, and anisic acid.

(11) Non bonzenoid cyclic mono and polycarboxylic acids such as abietic and camphoric acids, and heterocyclic carboxylic acids such as furoic acid.

Of the above organic acylating agents, those corresponding to the saturated aliphatic and aromatic acids are preferred. In most cases, compounds of higher V. I. can be prepared by use of the dibasic acid chlorides because of the formation of more resinous products thereby.

As aforesaid, the aryl nucleus T may be mono- or polycyclic, corresponding, for example, to phenol, naphthol, or anthrol and their "Y" derivatives. A preferred condensation product of the present invention derived from esterified alkyl-substituted phenol (hydroxybenzene) carboxylic acid may, in its simplest form, be represented by the general formula (II)
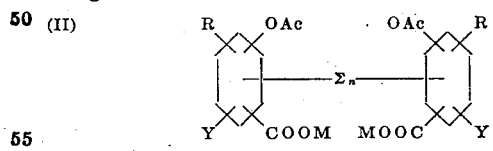

Since the condensation reaction employed in synthesizing the sulfides contemplated herein may be attended by a certain amount of multiple condensation, such further condensed compounds, herein called polymers, are included herein within the terms sulfides, etc., and as coming within the general formula I above. Polymers of this character which may be associated with or formed instead of the simple condensation compound of Formula II may be represented by the following general formula:

(III)
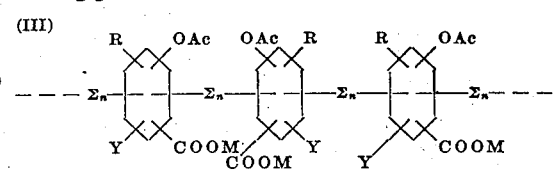

Also, where alkylation of the aryl nucleus has been effected to obtain a multifunctional product by a preferred procedure which involves, among other steps, the Friedel-Crafts condensation of a phenolic (hydroxyaromatic) compound with a halogenated aliphatic hydrocarbon material of at least twenty carbon atoms, such condensation may result in the formation of compounds in which two or more phenolic groups are interconnected by one or more aliphatic hydrocarbon chains. Compounds of this type, when further reacted to obtain the sulfides of esterified phenolic carboxylic acid salts, may result in the formation of compounds corresponding to the formula (IV)
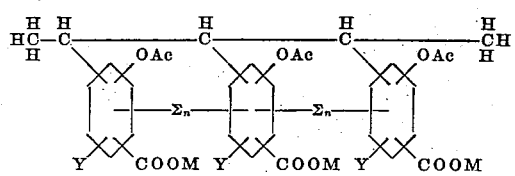

or compounds of the type illustrated by the formula (V)
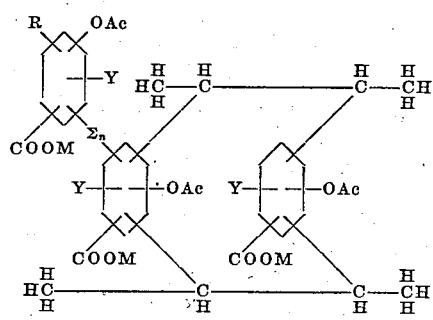

in which the chains correspond to the aliphatic hydrocarbon group R of general Formula I.

The foregoing discussion is not intended as a development of the complete molecular composition or structure of the compound or condensation products constituting the mineral oil addition agents contemplated herein but is considered to be the probable composition and structure of such addition agents. These addition agents may be broadly characterized as the sulfides (or the corresponding selenides or tellurides) of nuclear alkylated esterified hydroxyaromatic carboxylic acid salts and for purposes of definition and description herein these compounds are represented by general Formula I above, which is inclusive of such sulfides, selenides and tellurides in their simplest form as well as being inclusive of the different nuclear groups which characterize the more complex probable molecular compositions and structures. As aforesaid, the term "sulfide," as used herein, is inclusive of the monosulfides, disulfides, trisulfides, tetrasulfides, etc.; that is, it includes both monosulfides and polysulfides and is also intended to include such polymers and related derivatives as are believed to be formed by the hereinafter-described procedures employed to illustrate the synthesis of the addition agents contemplated by this invention. It should be pointed out that the condensed sulfur derivatives or sulfides of the alkylated esterified hydroxyaromatic carboxylic acid salts (or metal carboxylates) are the preferred class of addition agents contemplated herein. For that reason, the invention is specifically described with reference to the sulfides, but it is to be understood that the corresponding selenides and tellurides are contemplated by and come within the scope of the broad invention.

One general procedure for synthesizing the mono- and poly-sulfides of the esterified alkyl-substituted hydroxyaromatic carboxylic acid salts of the type contemplated herein involves the condensation of the corresponding alkylated hydroxyaromatic carboxylic acid with sulfur or sulfur halides, followed by the esterification of the hydroxyl group and subsequent substitution of the carboxyl hydrogen with the desired metal. In the above general procedure an alkali metal salt of the alkyl substituted hydroxyaromatic carboxylic acid (preferably the corresponding sodium phenate-sodium carboxylate), may be employed as the starting material in place of the free acid as will be more fully explained further on in connection with a specific example of this general method.

In the event sulfur dichloride ($SCl_2$) is used in the general procedure described above, the condensation product will be in the nature of a monosulfide (or a condensate or polymer thereof); sulfur monochloride ($S_2Cl_2$) will yield the corresponding disulfide (or a condensate or polymer thereof) and, of course, a mixture of sulfur halides may be employed to yield a mixture of such sulfides. Elementary sulfur may be employed as the condensation reagent, but this is not considered the most desirable procedure.

Sulfur derivatives of higher sulfur content may be obtained by reacting a compound having a disulfide linkage (obtained with sulfur monochloride) with sulfur or with alkali polysulfides or with an alkyl tetrasulfide. Such higher sulfur derivatives may also be obtained by first reducing the disulfide to form an aryl mercaptan or thiophenol of the alkylated hydroxyaromatic acid (or alkali metal carboxylate) and then reacting the thio-phenol with sulfur dichloride (to form the trisulfide) or with sulfur monochloride (to form the tetrasulfide), of the alkylated hydroxyaromatic carboxylic acid (or alkali metal salt thereof), which can then be acylated and converted to a polysulfide of a salt of the desired metal in the aforesaid manner.

The alkylated hydroxyaromatic carboxylic acid (or alkali metal salt thereof) used in the above general procedure in preparing the sulfides of the corresponding acylated derivatives may be obtained in various ways. For example, a hydroxyaromatic compound such as phenol or naphthol may first be alkylated to substitute part of the nuclear hydrogen with an alkyl group or groups of sufficient size to impart oil-miscibility to the ultimate product. This alkylated hydroxyaromatic compound may then be converted to the corresponding hydroxyaromatic carboxylic acid by a suitable carboxylation procedure. For example, the alkylated hydroxyaromatic compound may be subjected to the Kolbe synthesis described in detail in my copending application Serial No. 206,682, filed May 7, 1938, Patent No. 2,197,832, issued April 23, 1940, to form an alkali metal carboxylate salt of the alkylated hydroxyaromatic acid, which may be used as the starting material in the above general procedure or, if desired, this salt may be acidified to form the corresponding carboxylic acid or converted to an alkali-phenate-alkali carboxylate, either of which may also be employed as the starting material, as explained above.

The alkylation of the hydroxyaromatic compound may be carried out in various ways. A preferred procedure is to subject a hydroxyaromatic compound to a Friedel-Crafts condensation reaction with a halogenated aliphatic hydrocarbon, which for obtaining the preferred multifunctional addition agents should be an aliphatic hydrocarbon containing at least twenty carbon atoms. Mixed alkyl or aralkyl aryl ethers may also be used in the formation of alkylated hydroxyaromatic compounds by the Friedel-Crafts reaction, rearrangement of the alkyl or aralkyl ether radical taking place to give the phenolic —OH group. This alkylation may also be carried out with an unsaturated aliphatic hydrocarbon or with aliphatic alcohols, using anhydrous aluminum chloride as a catalyst. For obtaining the preferred multifunctional addition agents the unsaturated hydrocarbons or aliphatic alcohols should be high molecular weight compounds containing at least twenty carbon atoms such, for example, as eicosylene, cerotene, melene, polymerized isobutylene, etc., or myricyl alcohol, ceryl alcohol, etc.

The Friedel-Crafts synthesis is preferred for obtaining the alkylated hydroxyaromatic compound, and as a source of the alkyl substituent preference is given to mixed high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax of melting point not substantially less than about 120° F., which is predominantly comprised of aliphatic hydrocarbons having a molecular weight of about 350 and containing at least twenty carbon atoms.

Hydroxyaromatic compounds which may be used in the alkylation reaction are: mono- or poly-cyclic and mon- or poly-hydric hydroxyaromatic compounds which may or may not be otherwise substituted, as hereinafter indicated. Specific examples of compounds which may be used in this reaction are: phenol, resorcinol, hydroquinone, catechol, cresol, xylenol, hydroxydiphenyl, benzylphenol, phenylethyl phenol, phenol resins, methylhydroxydiphenyl, alpha and beta naphthol, xylyl naphthol, benzyl phenol, anthranol, phenylmethyl naphthol, phenanthrol, anisole, beta naphthyl methyl ether, chlorphenol, and the like. Preference in general is to the monohydroxy phenols otherwise unsubstituted, particular preference being given to phenol and alpha and beta naphthal.

Where it is desired to obtain a compound or condensation product in which the aryl nucleus contains in addition to, or instead of, residual hydrogen, a substituent of the type represented in general Formula I by $Y_b$, it is pointed out that with the exception of substituents such as aralkyl, aryl, alkaryl, halogen, hydroxyl, and aroxy, such Y groups are introduced after alkylating and carboxylating the hydroxyaromatic compound. Methods for the introduction of these $Y_b$ substituents into the simpler hydroxyaromatic compounds are well known to those skilled in the art and it has now been discovered that they are also applicable to the more complex hydroxyaromatic compounds employed in making the improving agents of the present invention. It should also be pointed out that where nuclear substituents are present containing methylene groups such as alkyl, keto, ether, ester radicals, etc., the same may also carry substituents such as halogen, cyano, nitro, and thio groups. The methods for introducing these substituents are also well known to those skilled in the art.

To illustrate the procedure which may be followed in preparing the addition agents contemplated by this invention, I will now describe the various steps which may be followed in synthesizing the monosulfide or the disulfide of the stannous carboxylate of esterified wax-phenolic acid.

By the term "wax" in this connection I mean, as previously indicated, a mixture of higher aliphatic radicals or groups corresponding to the higher aliphatic hydrocarbons which characterize petroleum wax, the resulting product being, therefore, a mixture of the sulfides (mono- or di-) of the corresponding stannous carboxylate salts of the esterified acylated phenol carboxylic acids.

The procedure to be followed in preparing other metal derivatives, other polysulfides and condensation products containing other alkyl substituents than those derived from petroleum wax and other aryl nuclei than that characterizing phenol will be obvious from the following description in the light of the foregoing.

As aforesaid, condensation products characterized by at least one "wax" substituent (or other equivalent high molecular weight alkyl group) in the aryl nucleus constitute a preferred class because of their multifunctional properties, but the present invention is not limited thereto.

*Alkylation of phenol*

A paraffin wax melting at approximately 120° F. and predominantly comprised of aliphatic compounds having at least 20 carbon atoms in their molecules is heated to about 200° F., after which chlorine is bubbled therethrough until the wax has absorbed about 10 per cent to about 16 per cent of chlorine, such product having an average composition between that corresponding to a monochlor-wax and a dichlor-wax. A quantity of chlor-wax thus obtained containing 3 atomic proportions of chlorine is heated to a temperature varying from just above its melting point to not over 150° F., and 1 mol of phenol (hydroxybenzene) is admixed therewith. The mixture is heated to about 150° F., and a quantity of anhydrous aluminum chloride corresponding to about 3 per cent of the weight of the chlor-wax in the mixture is slowly added with active stirring. The rate of addition of the aluminum chloride should be sufficiently slow to avoid violent foaming, and during such addition the temperature is preferably held at about 150° F.; after the aluminum chloride has been added, the temperature of the mixture may be increased slowly to control the evolution of HCl gas to a temperature of from 250° F. to 300-350° F. If the emission of HCl gas has not ceased when the final temperature is reached, the mixture may be held at 350° F. for a short time to allow completion of the reaction, but to avoid possible cracking of the wax the mixture should not be heated appreciably above 350° F., nor should it be held at that temperature for any extended length of time. Removal of non-alkylated material (phenol) can be effected generally by water-washing but it is preferable to treat the water-washed product with super-heated steam, thereby insuring complete removal of the unreacted material and accomplishing the drying of the product in the same operation.

A wax-substituted phenol prepared according to the above procedure in which a quantity of chlor-wax containing 3 atomic proportions of chlorine (16 per cent chlorine in the chlor-wax) is reacted with 1 molecular proportion of phenol, may for brevity herein be designated as "wax-phenol (3-16)." Parenthetical expressions of the type (A-B) will be used hereinafter in connection with the alkylated hydroxyaromatic compounds to designate (A) the number of atomic proportions of chlorine in the chloraliphatic material reacted with one mol of hydroxyaromatic compound in the Friedel-Crafts reaction and (B) the percentage of chlorine in the chloraliphatic material. In the above example A=3 and B=16. The same designation will also apply to the sulfides of the wax-substituted esterified hydroxyaromatic carboxylic acid salts which constitute the ultimate product derived from the wax-phenol.

CARBOXYLATION OF WAX-PHENOL

In forming the carboxylic acid or the alkali metal carboxylate of a wax-phenol of the type obtained by the procedure described above, a preferred method involves, first, the substitution of the phenolic hydrogen with alkali metal, followed by carboxylation with $CO_2$ gas. Because of the high viscosity of the mixtures it is advantageous to dilute the wax-phenol initially with from one to three parts of heavy mineral oil, in which case the finished product is a concentrated mineral oil blend. By the use of mineral oil diluent, wax phenols of higher phenol content can be used in the formation of products of this invention. The formation of a wax-alkali-metal-phenate, for example, may be carried out by diluting 500 parts by weight of wax-phenol obtained according to the foregoing procedure, with 1500 parts by weight of mineral oil of Saybolt viscosity of about 60 seconds at 210° F., and reacting with 16 parts by weight of metallic sodium (or equivalent amount of metallic potassium). The reaction mixture is heated at about 500° F. during a two-hour period with rapid stirring to produce finely divided alkali metal and thereby accelerate the reaction. Wax-substituted alkali metal phenates may also be prepared by reacting the wax-phenol with an alcoholate of the alkali metal such as sodium butylate. For this purpose anhydrous aliphatic alcohols are usually the most suitable; and as an example, 500 parts by weight of wax-phenol (3-16) was reacted with 16 parts by weight sodium in the form of ethyl or butyl sodium oxide by heating the mixture to about 300° F. during about a one-hour period and allowing the alcohol released in the reaction to distill off.

The wax-sodium phenate obtained according to the foregoing procedures is then carboxylated. This carboxylation may be carried out in various ways, one effective procedure being to heat the wax-sodium phenate in mineral oil blend to a temperature of about 350° F. and introduce $CO_2$ at this temperature. The pressure is gradually raised to about 500 pounds per square inch to complete the reaction at this temperature during a one-hour period. The carboxylation can also be carried out at atmospheric pressure, a suitable procedure consisting of introducing a current of $CO_2$ into the wax sodium phenate in mineral oil blend at a temperature of about 400° F., the carboxylation requiring about 10 hours, depending somewhat upon the rate of stirring of the mixture.

The product of this step is the sodium carboxylate salt of wax-substituted phenol carboxylic acid (3-16); or in case mineral oil is used as diluent, it is a mineral oil solution of such salt. When completely carboxylated, the mixture loses its gelatinous nature, changing to a fluid homogeneous product. In the absence of diluent, the wax sodium phenate is changed from a waxy product to a resilient, rubbery material.

This salt may be converted, if desired, to the corresponding carboxylic acid by neutralization with a mineral acid or it may be converted to a sodium phenate-carboxylate salt by reacting with an amount of sodium alcoholate containing sodium equivalent to the hydroxyl hydrogen of the phenol sodium carboxylate.

FORMATION OF THE SULFIDES OF WAX-PHENOL CARBOXYLIC ACID

In the event the product of the foregoing step is a wax-phenol carboxylic acid, the corresponding sulfides thereof may be obtained by dissolving the acid in a suitable solvent such as carbon disulfide, benzene, chlorbenzene, ethylene dichloride, Stoddard Solvent, or the like, and bringing the temperature of the solution up to about 100° F., which is followed by addition of a sulfur halide (mono- or di-) or mixture of sulfur halides during about a ½-hour period. The mixture may then be held at this temperature for about one hour to complete the formation of the sulfide derivative. HCl is evolved in the reaction, resulting in fixation of the sulfur in the aryl nucleus. As regards the temperature of the reaction, it is to be understood that the reaction can be carried out at various temperatures from room temperature up to the boiling point of the solvent, but it is preferable for obtaining light-colored products that the temperature be not too high. The addition of the sulfur halide is controlled so as to prevent over-heating of the mixture by its heat of reaction. This mixture is then water-washed to remove dissolved hydrochloric acid, and the free phenol-carboxylic acid may be acylated as hereinafter described, or if desired it may be esterified after conversion to its corresponding alkali salt.

Where the Kolbe synthesis has been employed as the carboxylation procedure, the wax-phenol carboxylic acid may conveniently be obtained, as aforesaid, in the form of the alkali metal phenate-alkali metal carboxylate. The sulfide derivatives can be obtained from this product by treating with sulfur halide without first liberating the free acid, and in this case free HCl is not evolved unless an amount of sulfur halide in excess of the sodium content is used, the HCl being converted to sodium chloride by reaction with the alkali-phenate-carboxylate salt. When the alkali phenate carboxylate salt of the acid is reached in the manner just described, solvents such as carbon disulfide and ethylene dichloride must be replaced with solvents such as alcohol, benzene, or chlorbenzene to avoid side reactions with the alkali derivative.

The following example illustrates a preferred method of preparing the stannous salt of the phosphite ester of wax-phenol carboxylic acid disulfide which is one of the preferred oil-improving agents of the present invention. It is to be understood, however, that my invention is not limited to the details of this specific example which is given merely by way of illustration and from which, taken in connection with the explanations and descriptions given above, the various other procedures and methods which may be followed for making this same product and for making the various other products comprised by the present invention will be apparent to those skilled in the art.

Example I

*Preparation of the stannous salt of the phosphite ester of wax-phenol carboxylic acid disulphide*

REACTION MIXTURE

|  | grams |
|---|---|
| Sodium phenate-carboxylate salt of wax-phenol carboxylic acid (3–16) | 100 |
| Mineral oil (as diluent) | 300 |
| Sulfur monochloride | 9.8 |
| Phosphorous trichloride | 6.7 |
| Stannous chloride (anhydrous) | 14 |
| Sodium | 3.36 |

The sodium salt of wax phenolic acid in mineral oil blend, is diluted with an equal weight of chlorbenzene and the sulfur monochloride added at about 100° F. at a rate sufficiently slow to prevent an increase in temperature of the reaction mixture by the heat of reaction, the addition of the sulfur monochloride requiring about a half hour period. The phosphorous trichloride is then added at 100° F., after which the sodium in the form of sodium butylate is added, followed by addition of the stannous chloride, whereby stannous butylate is formed. The reaction mixture is then heated to about 250° F. to form the stannous carboxylate salt, and water washed or filtered through "HiFlo" to remove the sodium chloride formed in the reaction. The reaction mixture is then steam treated at about 300° F. to remove all traces of volatile solvent. The steam vapor is then removed by applying vacuum or running through the mineral oil blend of the product a current of nitrogen to obtain the finished product.

The product of the foregoing specific example is the disulfide of the phosphite ester of wax-phenol carboxylic acid in which the carboxyl hydrogen is substituted with its equivalent weight of tin. It may also be termed the stannous carboxylate of the phosphite ester of wax-phenol carboxylic acid disulfide. The procedure to be followed in obtaining the corresponding carboxylate disulfides of metals other than tin will be readily apparent from the foregoing to those skilled in the art, as will also the variations in the procedure necessary to obtain the monosulfide and other polysulfides.

Addition agents of the type obtained according to the foregoing procedure may be admixed with mineral oil fractions in minor amounts from about 1/16 per cent to 10 per cent to obtain mineral oil blends of improved pour point and viscosity index, such oils being thereby also stabilized against those deleterious effects of oxidation which, for example, are manifested in an internal combustion engine by the formation of sludge, acid, and by the formation of "lacquer." These oil blends, in addition to being of improved pour point and viscosity index, therefore, may be used in internal combustion engines and under the conditions of use encountered therein produce a marked decrease in the tendency to form acid and sludge and a further marked decrease in the tendency to cause piston ring-sticking and the filling of the slots in the oil rings with a deposit.

To demonstrate the improved properties obtained in mineral oil blends containing addition agents of the type discussed herein, I have conducted several comparative tests with representative mineral oils alone and with the same oils blended with these improving agents, the results of such tests being disclosed in the following examples.

Example Two

*Pour point depression*

These tests were conducted with a motor oil having a Saybolt viscosity of 67 seconds at 210° F. and a pour point of +20° F. The pour points of blends formed from this oil and representative sulfides of esterified wax-phenol carboxylic acid salts of various metals are listed in Table I below, from which it will be observed that the addition agents contemplated herein, when the aryl nucleus is substituted with wax, are highly effective pour point depressants.

Table I

ACTION OF METAL SALTS OF ESTERIFIED WAX PHENOL CARBOXYLIC ACID SULFIDES AS POUR POINT DEPRESSANTS

| Improving agent | A. S. T. M. pour test | | |
|---|---|---|---|
|  | 0% | 1/16% | 1/8% |
|  | °F. | °F. | °F. |
| Stannous salt of phthalyl ester of wax-phenol carboxylic acid disulfide (3–16) | +20 | −10 | −20 |
| Stannous salt of phosphite ester of wax-phenol carboxylic acid disulfide (3–16) | +20 | −10 | −20 |
| Cobaltous salt of phosphite ester of wax-phenol carboxylic acid disulfide (3–16) | +20 | 0 | −15 |
| Stannous salt of phosphite ester of wax-phenol carboxylic acid tetrasulfide (3–14) | +20 |  | −15 |
| Stannous salt of thiophosphate ester of wax-phenol carboxylic acid disulfide (3–16) | +20 | −5 | −15 |

Example Three

*Viscosity index improvement*

The data listed in Table II below showing the effectiveness of the addition agents contemplated herein for improving viscosity index were obtained in the conventional manner from the Saybolt viscosity of the oil and the oil blends at 100° F. and 210° F. The oil used was a viscous mineral oil of the lubricant type.

Table II

ACTION OF METAL SALTS OF ESTERIFIED WAX-PHENOL CARBOXYLIC ACID SULFIDES AS VISCOSITY INDEX IMPROVERS

| Improving agent | Per cent concen. by weight | 100° F. | 210° F. | V. I. |
|---|---|---|---|---|
| None | 0 | 140.7 | 41.8 | 79.3 |
| Stannous salt of phthalyl ester of wax-phenol carboxylic acid disulfide (3–16) | 1 | 158.5 | 43.7 | 97.6 |
| Stannous salt of phosphite ester of wax-phenol carboxylic acid disulfide (3–16) | 1 | 153.8 | 43.3 | 96.1 |
| Cobaltous salt of phosphite ester of wax-phenol carboxylic acid disulfide (3–16) | 1 | 150.1 | 42.9 | 92.7 |
| Stannous salt of phosphite ester of wax-phenol carboxylic acid tetrasulfide (3–14) | 1 | 150.0 | 42.6 | 85.3 |
| Stannous salt of thiophosphate ester of wax-phenol carboxylic acid disulfide (3–16) | 1 | 159.9 | 43.9 | 100.0 |

Example Four

*Operation test*

In addition to the foregoing tests I have also made comparative tests between an oil and an oil blend containing representative improving agents of the type contemplated herein to determine the comparative behavior of the unblended oil and the improved oil under actual operating conditions. The tests were carried out in a single cylinder C. F. R. engine operated continuously over a time interval of 28 hours with the cooling medium held at a temperature of about 390° F.

and the oil temperature held at about 150° F. The engine was operated at a speed of 1200 R. P. M.

The oil used in the test was a lubricating oil stock of 120 seconds Saybolt viscosity at 210° F., and the conditions observed were:

(a) The extent to which the piston rings were stuck;
(b) The extent to which the slots in the oil rings were filled with deposit;
(c) The amount of carbonaceous deposits in the oil; and
(d) The neutralization number or acidity (N. N.) of the oil.

The results obtained in these tests are set forth in Table III below, wherein oil $A_1$, $A_2$, etc., represents the oil alone; oil $B_1$, $B_2$, etc. represents the same oil containing addition agents as follows:

$B_1 = \frac{1}{2}$ per cent of cobaltous salt of phosphite ester of wax-phenol carboxylic acid disulfide (3-16).

$B_2 = \frac{1}{2}$ per cent of cobaltous salt of phosphite ester of diamyl phenol carboxylic acid disulfide.

$B_3 = 1$ per cent of stannous salt of phosphite ester of wax-phenol carboxylic acid disulfide (3-16).

$B_4 = \frac{1}{2}$ per cent of stannous salt of phthalyl ester of wax-phenol carboxylic acid disulfide (3-16).

The amount of improving agent used may be varied depending upon the mineral oil with which it is blended and the properties desired in the final oil composition. The sulfide derivatives of alkylated esterified hydroxyaromatic carboxylic acid salts of the type contemplated herein may be used in amounts ranging from $\frac{1}{16}$ per cent to 10 per cent and in general, compositions of the desired improved properties may be obtained with amounts in the neighborhood of 1 per cent.

*Table III*

ACTION OF METAL SALTS OF ESTERIFIED WAX-PHENOL CARBOXYLIC ACID SULFIDES AS INHIBITORS IN CFR RING TEST (28 HOURS)

| Oil | Degrees stuck | | | | Percent slots filled | | | | Grams carbon deposit | N. N. |
|---|---|---|---|---|---|---|---|---|---|---|
| | 1 | 2 | 3 | 4 | 5 | 3 | .4 | 5 | | |
| $A_1$ | 360 | 360 | 360 | 360 | 360 | 70 | 80 | 80 | 20.2 | 1.9 |
| $B_1$ | 90 | 0 | 0 | 0 | 0 | 0 | 0 | 0 | 4.3 | 1.1 |
| $A_2$ | 360 | 360 | 360 | 360 | 360 | 70 | 80 | 90 | 14.0 | 2.7 |
| $B_2$ | 360 | 0 | 0 | 0 | 0 | 0 | 0 | 0 | 6.5 | 2.2 |
| $A_3$ | 120 | 0 | 360 | 360 | 360 | 70 | 70 | 80 | 14.2 | 2.5 |
| $B_3$ | 120 | 0 | 0 | 0 | 0 | 0 | 0 | 0 | 7.3 | 1.6 |
| $A_4$ | 90 | 360 | 360 | 360 | 360 | 90 | 80 | 70 | 13.7 | 1.7 |
| $B_4$ | 0 | 0 | 240 | 90 | 0 | 20 | 0 | 0 | 8.5 | 1.0 |

As indicated above, it is important for the obtainment of the multifunctional compounds having pour depressant and V. I. improving action as well as inhibiting action against acid and sludge formation etc., that the characterizing aromatic nucleus of such compounds have at least one alkyl substituent containing at least 20 carbon atoms, but it is to be understood that alkyl substituents corresponding to aliphatic hydrocarbons of lower molecular weight, sufficient only to solubilize the compound or condensation product in mineral oil, may be used as addition agents to retard the deleterious effects of oxidation. For example, the metal carboxylate derivatives of diamyl acylated-phenol carboxylic acid sulfides may be employed as effective antioxidants.

It is to be understood that while I have described certain preferred procedures which may be followed in preparation of the sulfide condensation products contemplated herein as oil-improving agents and have referred to various representative constituents in these improving agents, such procedures and examples have been used for illustrative purposes only. The invention, therefore, is not to be considered as limited by the specific examples given but includes within its scope such changes and modifications as fairly come within the spirit of the appended claims.

I claim:

1. An improved mineral oil composition comprising a mineral oil having admixed therewith an oil-miscible substantially stable condensation product of an hydroxyaromatic carboxylic acid in which part of the nuclear hydrogen is substituted with a long chain aliphatic hydrocarbon group having mineral-oil-solubilizing properties and in which the carboxyl hydrogen is substituted with its equivalent weight of metal and in which the hydroxyl group of the hydroxyaromatic group is substituted with the radical of an oxyacid which remains after removal of an acidic hydroxyl group therefrom, said condensation product comprising at least two aryl nuclei interconnected by at least one atom selected from the group consisting of sulfur, selenium and tellurium.

2. The composition of claim 1 in which the long chain aliphatic hydrocarbon group contains at least twenty carbon atoms.

3. An improved mineral oil composition comprising a mineral-oil having admixed therewith a minor proportion of a mixture of oil-miscible substantially stable condensation products of nuclear alkyl-substituted hydroxyaromatic carboxylic acids in which the carboxyl hydrogen of each of the carboxylic acids is substituted with its equivalent weight of metal and in which the hydroxy group of each of the hydroxyaromatic groups is substituted with the radical of an oxyacid which remains after the removal of an acidic hydroxyl group therefrom and in which each of the condensation products comprises at least two aryl nuclei interconnected by at least one atom selected from the group consisting of sulfur, selenium and tellurium; the said nuclear alkyl substituents in the mixture of the said condensation products corresponding to the aliphatic hydrocarbon compounds normally present in petroleum wax.

4. The composition of claim 3 in which the aryl nuclei are phenyl nuclei.

5. The composition of claim 3 in which the metal is selected from the group consisting of tin and cobalt.

6. The composition of claim 3 in which the aryl nuclei are phenyl nuclei and in which the metal is selected from the group consisting of tin and cobalt.

7. The composition of claim 3 in which the aryl nuclei are phenyl nuclei and in which at least two of the phenyl nuclei of each of the condensation products are interconnected by at least one atom of sulfur and in which the metal is tin.

8. The composition of claim 1 in which the oxyacid radical is the radical of an inorganic oxyacid.

9. The composition of claim 1 in which the oxyacid radical is the radical of an inorganic oxyacid and in which the alkyl group contains at least twenty carbon atoms.

10. The composition of claim 3 in which the oxyacid radical is the radical of an inorganic oxyacid.

11. The composition of claim 3 in which the aryl nuclei are phenyl nuclei and in which the oxyacid radical is the radical of an inorganic oxyacid.

12. The composition of claim 3 in which the aryl nuclei are phenyl nuclei and in which the oxyacid radical is the radical of an inorganic oxyacid and in which the metal is selected from the group consisting of tin and cobalt.

13. The composition of claim 1 in which at least two of the hydroxyaromatic nuclei are interconnected by a single sulfur atom.

14. The composition of claim 1 in which at least two of the aryl nuclei are interconnected by a plurality of sulfur atoms.

15. The composition of claim 1 in which at least two of the aryl nuclei are interconnected by two sulfur atoms.

16. The composition of claim 1 in which the aryl nucleus is a phenyl nucleus.

17. The composition of claim 1 in which the aryl nucleus is a phenyl nucleus and in which the metal is tin.

18. The composition of claim 3 in which the aryl nuclei are phenyl nuclei and in which the metal is tin.

19. The composition of claim 1 in which the metal is selected from the group consisting of tin and cobalt.

20. The composition of claim 3 in which the aryl nuclei each also carries added hydrogen obtained by hydrogenation or nuclear hydrogen replaceable by a substituent selected from the group consisting of: hydroxyl, ester group, xanthate, alkyl sulfide, aryl sulfide, keto, alkoxy, aroxy, aldehyde group, oxime group, aralkyl, aryl, alkaryl, halogen, nitroso, N-thio, N-acyl and cyano.

21. The composition of claim 1 in which the oxyacid radical is the radical of an inorganic oxyacid.

22. The composition of claim 1 in which the acyl group is the acyl group of an inorganic oxyacid and in which the metal is selected from the group consisting of tin and cobalt.

23. The composition of claim 3 in which the aryl nuclei are phenyl nuclei and in which the oxyacid radical is the radical of an inorganic oxyacid and in which the metal is tin.

24. The composition of claim 1 in which the aryl nucleus also carries added hydrogen obtained by hydrogenation or nuclear hydrogen replaceable by a substituent selected from the group consisting of: hydroxyl, ester group, xanthate, alkyl sulfide, aryl sulfide, keto, alkoxy, aroxy, aldehyde group, oxime group, aralkyl, aryl, alkaryl, halogen, nitroso, N-thio, N-acyl and cyano.

25. The composition of claim 3 in which the oxyacid radical is the radical corresponding to phosphorous acid and in which the metal is tin and in which the aryl nuclei are interconnected by two atoms of sulphur.

26. An improved mineral oil composition comprising a mineral oil having admixed therewith a minor proportion of a substantially stable, oil-miscible metalorganic condensation product corresponding to the general formula

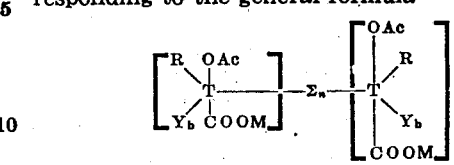

in which T represents an aromatic nucleus; R represents at least one oil-solubilizing alkyl group; Ac represents the radical of an oxyacid which remains after removal of an acidic hydroxyl group therefrom; Y is selected from the group consisting of hydrogen, hydroxyl, ester group, xanthate, alkyl sulfide, aryl sulfide, keto, alkoxy, aroxy, aldehyde group, oxime group, aralkyl, aryl, alkaryl, halogen, nitroso, N-thio, N-acyl and cyano substituents; $b$ represents the number of Y's and is equal to zero or a whole number corresponding to replaceable hydrogens on the nucleus T not satisfied with R, OAc, COOM, and $\Sigma_n$; M represents the hydrogen equivalent of a metal; $\Sigma$ represents an element selected from the group consisting of sulfur, selenium, and tellurium; and $n$ represents a whole number from one to four.

27. An improved mineral oil composition comprising a mineral oil having admixed therewith a minor proportion of a substantially stable, oil-miscible metalorganic condensation product corresponding to the general formula

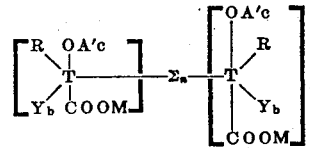

in which T represents an aromatic nucleus; R represents at least one oil-solubilizing alkyl group; A'c represents the radical of an inorganic oxyacid which remains after removal of an acidic hydroxyl group therefrom; Y is selected from the group consisting of hydrogen, hydroxyl, ester group, xanthate, alkyl sulfide, aryl sulfide, keto, alkoxy, aroxy, aldehyde group, oxime group, aralkyl, aryl, alkaryl, halogen, nitroso, N-thio, N-acyl and cyano substituents; $b$ represents the number of Y's and is equal to zero or a whole number corresponding to replaceable hydrogens on the nucleus T not satisfied with R, OA'c, COOM and $\Sigma_n$; M represents the hydrogen equivalent of a metal; $\Sigma$ represents an element selected from the group consisting of sulfur, selenium, and tellurium; and $n$ represents a whole number from one to four.

ORLAND M. REIFF.